(No Model.)
L. A. BRIGEL.
WATER ELEVATOR.
No. 355,582. Patented Jan. 4, 1887.
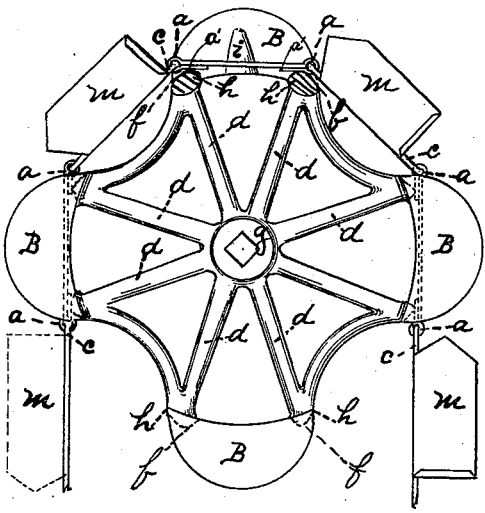
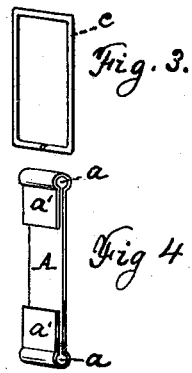
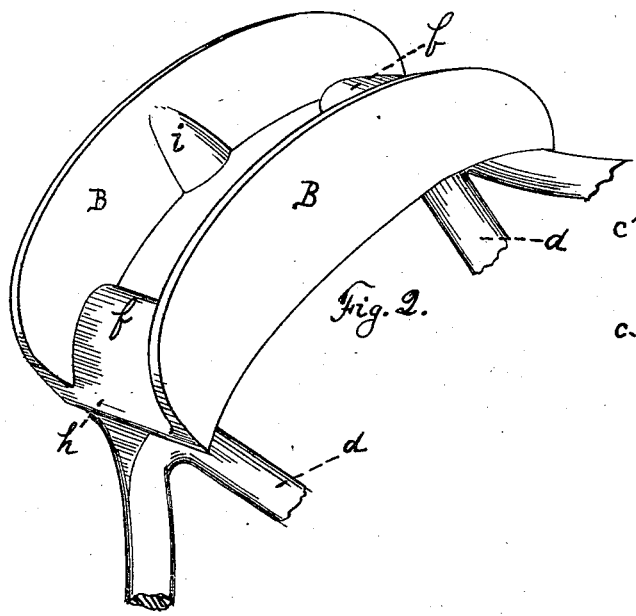
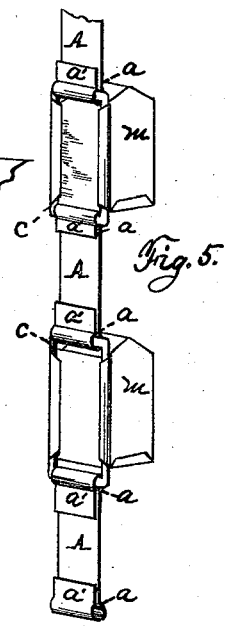
WITNESSES:
Frances Farnsworth.
T. J. Wyscarver.
INVENTOR:
Leo A. Brigel.
By Oscar Snell.
Attorney.

UNITED STATES PATENT OFFICE.

LEO A. BRIGEL, OF CINCINNATI, OHIO.

WATER-ELEVATOR.

SPECIFICATION forming part of Letters Patent No. 355,582, dated January 4, 1887.

Application filed January 30, 1886. Serial No. 190,340. (No model.)

*To all whom it may concern:*

Be it known that I, LEO A. BRIGEL, a citizen of the United States, residing at Cincinnati, in the county of Hamilton and State of Ohio, have invented a new and useful Improvement in Water-Elevators, of which the following is a specification.

This invention relates to endless chain and bucket water-elevators; and it consists in an improved construction of the top wheel, which carries and operates the chain and buckets, so that rapid wear upon all the parts is obviated, but especially the buckets and links.

Similar letters refer to like parts in all the drawings.

Figure 1 is a side view of the general construction of wheel. Fig. 2 is a perspective view of one of the flanged sections of the wheel with contact-points for the flat links of the chain. Fig. 3 is one of the rectangular wire links; Fig. 4, one of the flat links, with the loops or hooks shown at the ends for attaching the rectangular links; and Fig. 5 is a view of the links and buckets strung together, as they appear when ready for use.

As shown by the drawings, the flat links A are made of heavy hoop-iron having bent ends forming hooks $a$. These ends, when closed down in position, lap about one inch. The wheel, as shown in Fig. 1, instead of having a continuous flange around the circumference on each side has the flanges cut away, to prevent the sides of the buckets $m$ being abraded where they take position on the wheel when in action.

As shown by Fig. 5, the buckets $m$ have the rectangular wire-links $c$, Fig. 3, secured to the back, the ends of the links projecting, so that the hooks $a$ at the ends of the flat links A can be hooked on and pressed down to hold the round links in position in the hooks. The top wheel, as shown in Fig. 1, is made with a number of spokes, $d$, and a central hub, $g$. The ends $h$ of the spokes terminate laterally in a T-shaped bearing for the flat links at the circumference of the wheel. (Shown at $f$.) The sides of the T-shaped ends of the spokes are connected together by flanges B, and upon the inside face at the center of their length is a slight elevation, $i$, of the surface to bear against the edge of the flat links and hold them in a central position between the flanges B.

As before mentioned, the peculiar construction of the wheel is to prevent wear upon the buckets; which, being made of thin sheet-iron to make them light in weight, soon wear into holes, and leak if continually brought in contact with the flanges of the top wheel, which bears the weight of the chain, buckets, and water that is being elevated, and is the part where the principal wear takes place in water-raising apparatus of this class.

When the chain is in position on the wheel, Fig. 1, it will be noticed that the laps $a'$ of the hooks at the ends of the flat links A rest on the contact-points $f$ of the wheel and receive all the weight of the chain, buckets, and water. It is obvious that if any wear takes place on the laps of the hooks the strength of the flat link is not impaired so much as if the link were turned over and the wear imposed upon its main body.

The flat links A are longer than the distance between the bearing or contact-points $f$ on the wheel, so that the ends of the links project sufficient to receive the ends of the rectangular links $c$, which are secured to the buckets. The chain is usually prevented from sliding around on the wheel by the friction of the flat links in contact with the bearing-points $f$, but is effectually prevented from slipping by the ends of the rectangular links coming in contact with the ends of the flanges B, should any extra strain be imposed upon the chain by the water having to be lifted from very deep wells. The rectangular links being secured to the buckets, and being longer, prevent the buckets from coming in contact with any part of the wheel by carrying them between each set of flanges, as shown in Fig. 1.

The principal advantages are: The combination of this construction of wheel and chain will prevent the chain from slipping, climbing, or shifting out of position, and prevents wear upon the thin metal buckets, and will operate with very little friction. The entire wear of the chain where it comes in contact with the wheel being upon the laps of the hooks of the flat links, the durability of the chain and buckets is increased fifty per cent. over any similar combination for the purpose yet invented. The weight of the wheel being reduced over one-third in comparison with wheels having flanges around the entire circumference for a similar purpose, the cost is reduced in proportion.

Actual tests in very cold weather demonstrate that this wheel never will become clogged with ice, which has been the cause of much annoyance with every form of top wheel yet devised of the ordinary type with a continuous flange around the circumference, and which necessarily come in contact with the buckets.

I claim as my invention—

The top wheel of an endless chain and bucket water-elevator having flanges B, placed at intervals and in pairs at the circumference, with the laps $a'$ of the flat links in contact with the bearing-points $f$, and the sides of the flat links in contact with the elevation $i$ on the inside of the flanges for the purpose of holding the flat link in a central position, the rectangular links connecting the flat links between each pair of flanges and holding the buckets suspended out of contact with the wheel for the purpose of preventing wear on the buckets and the wheel becoming inoperative by the accumulation of ice.

LEO A. BRIGEL.

Witnesses:
PAUL H. WILLIAMSON,
WILLIAM CREED.